(12) United States Patent
Koslow et al.

(10) Patent No.: US 6,395,190 B1
(45) Date of Patent: *May 28, 2002

(54) PROCESS EMPLOYING THIN-WALLED, EXTRUDED ACTIVATED CARBON FILTER

(75) Inventors: Evan E. Koslow, Weston; Richard D. Kendrick, Stratford; Gordon Spilkin, Stamford, all of CT (US)

(73) Assignee: KX Industries, L.P., Orange, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/902,231

(22) Filed: Jul. 29, 1997

Related U.S. Application Data

(62) Division of application No. 08/902,571, filed on Jul. 29, 1997, now Pat. No. 5,922,803, which is a division of application No. 08/607,294, filed on Feb. 26, 1996, now abandoned.

(51) Int. Cl.[7] .............................. C02F 1/28; C02F 1/62; B01D 39/00
(52) U.S. Cl. .................. 210/767; 210/694; 210/497.01; 210/496; 210/912; 264/DIG. 58
(58) Field of Search .................................. 210/679, 680, 210/690, 691, 692, 693, 694, 767, 496, 912, 497.01; 264/DIG. 58

(56) References Cited

U.S. PATENT DOCUMENTS

| | | | |
|---|---|---|---|
| 5,189,092 A | | 2/1993 | Koslow |
| 5,225,081 A | | 7/1993 | Brownawell |
| 5,331,037 A | | 7/1994 | Koslow |
| 5,356,852 A | * | 10/1994 | DeLiso et al. |
| 5,380,594 A | | 1/1995 | Von Blucher et al. |
| 5,388,637 A | * | 2/1995 | Jones et al. |
| 5,389,325 A | * | 2/1995 | Bookbinder et al. |
| 5,485,675 A | * | 1/1996 | Jones et al. |
| 5,726,118 A | * | 3/1998 | Ivey et al. |
| 5,922,803 A | * | 7/1999 | Koslow et al. ............. 524/496 |

FOREIGN PATENT DOCUMENTS

GB 1083353 9/1967

* cited by examiner

Primary Examiner—Robert J. Popovics
(74) Attorney, Agent, or Firm—Ohlandt, Greeley, Ruggiero & Perle, LLP; David Aker

(57) ABSTRACT

An extruded, thin-walled activated carbon filter tube having a wall thickness of about 0.5 inch (12.7 mm) or less and an average dry density sufficient to remove at least about 99.5% of sub-micron particles from a liquid filtered through said tube.

6 Claims, 1 Drawing Sheet

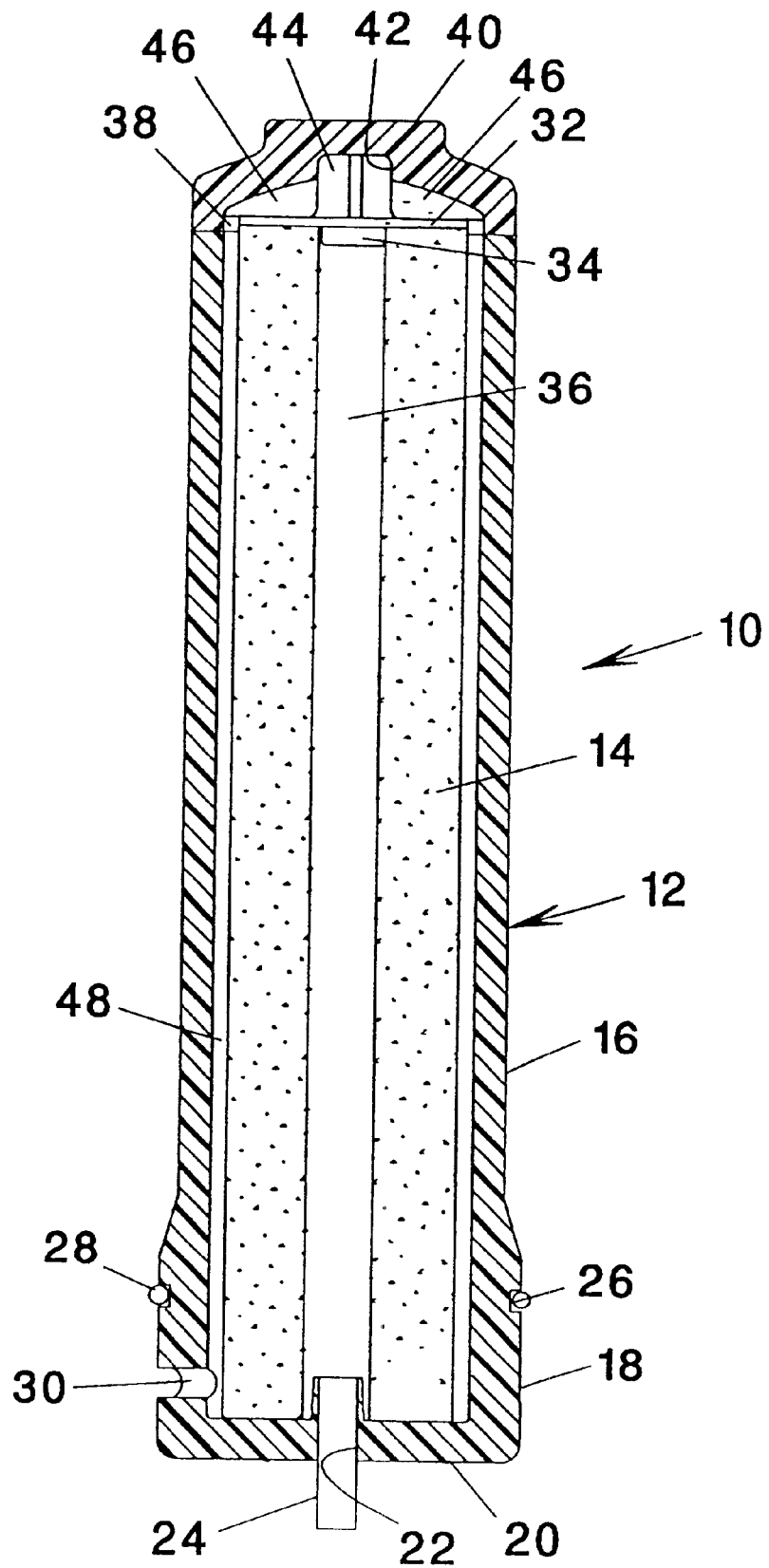

PROCESS EMPLOYING THIN-WALLED, EXTRUDED ACTIVATED CARBON FILTER

RELATED APPLICATION

This application is a divisional of application Ser. No. 08/902,571, filed Jul. 29, 1997, now U.S. Pat. No. 5,922,803, which is a continuation of application Ser. No. 08/607,294, filed Feb. 26, 1997, now abandoned.

FIELD OF THE INVENTION

This invention relates to a filter process employing a novel thin-walled, extruded activated carbon filter, especially such a filter for use in room temperature water purification processes for removal of sub-micron sized particulates.

BACKGROUND OF THE INVENTION

Presently used in filtration systems, where particulate removal in the range of 99.5% or more of particulates of a size of 0.5 $\mu$m to 0.8 $\mu$m, are ceramic candle filters. Such ceramic filters are primarily designed for high temperature applications. However, due to the unavailability of suitable lower cost filters which would still provide the aforesaid degree of sub-micron particulate removal, such ceramic filters have also been employed for filtration or purification processes even when high temperatures are not required, such as at room temperature processes for purification of water. Such use of ceramic filters, when their high temperature properties are not required, results in a greatly increased filtration or purification cost due to the costly nature of such ceramic filters.

Although activated carbon filters have been known and used in water purification processes, it has not heretofore been possible to achieve the aforesaid level of particulate removal employing known activated carbon filters.

It would therefore be desirable that a highly effective thin-walled activated carbon filter be available for use in low temperature filtration and purification processes to replace the unduly expensive ceramic filter units now employed to obtain 99.5% or more removal of particulates of a size of 0.5 $\mu$m to 0.8 $\mu$m.

SUMMARY OF THE INVENTION

It has been discovered that an extruded, thin-walled activated carbon filter tube capable of removing 99.5% or more of sub-micron sized particles of a size of from 0.5 $\mu$m to 0.8 $\mu$m from water or other liquids at room temperature is provided according to this invention by extruding such a thin-walled activated carbon filter from a composition comprising an essentially homogeneous admixture of:

(a) from about 75% to about 85% by weight activated carbon particles, and (b) from about 15% to about 25% by weight of a thermoplastic binder powder having an average particle size of from about 5 $\mu$m to about 25 $\mu$m;

wherein the activated carbon particles comprise:

(a) from about 18% to about 50% by weight of activated carbon particles passing through a 325 mesh screen, i.e. −325 mesh fraction, and (b) from about 50% to about 82% by weight of activated carbon particles passing through a 200 mesh screen and retained on a 325 mesh screen, i.e. −200 to +325 mesh fraction.

By thin-walled filter tube of this invention it is meant that the activated carbon filter tube has a wall thickness of 0.5 inch (12.7 mm) or less, more preferably 0.3 inch (7.62 mm) or less.

A thin-walled activated carbon filter can be extruded from said composition by the continuous extrusion process disclosed in my earlier U.S. Pat. No. 5,189,092, and will have a density sufficient to remove 99.5% of particles of a size of 3 microns or larger, preferably sufficient to remove 99.5% of particles of a size of about 0.5 $\mu$m to 0.8 $\mu$m.

BRIEF DESCRIPTION OF THE DRAWING

The FIGURE is a cross-sectional view of an activated carbon filter of this invention.

DETAILED DESCRIPTION OF THE INVENTION

Although my earlier U.S. Pat. No. 5,189,092 disclosed extrusion of compositions comprising activated carbon particles and thermoplastic binder powder to produce filtration articles, the activated carbon filters produced in said patent were not capable of particulate removal of 99.5% or more of particles of a size of 0.5 $\mu$m to 0.8 $\mu$m, nor was it considered possible to produce activated carbon tubes having a wall thickness of less than 0.5 inch (12.7 mm) and especially such tubes having a wall thickness of 0.3 inch (7.62 mm) or less.

It has been discovered that with the aforedescribed homogenous mixture of the two different sized activated carbon particles, i.e. from about 75% to about 85% by weight of about 18% to 50% by weight of −325 mesh activated carbon particles and about 50% to 82% by weight −200 to +325 activated carbon particles, employed with about 15% to about 25% by weight of thermoplastic powder having an average particle size of from about 5 $\mu$m to about 25 $\mu$m, extrusion of such a thin-walled filter tube could be accomplished to provide a filter element capable of removing 99.5% or more of particles of a size of 0.5 $\mu$m to 0.8 $\mu$m.

Any suitable activated carbon particles of the stated sizes can be employed in producing the thin-walled filter tubes of this invention. Among those activated carbon particles suitable for use and available from Calgon Carbon Corporation is Type TOG-NDS activated carbon, which is understood to be acid washed, bituminous coal-based activated carbon particles.

Although from about 18% to about 50% by weight of −325 mesh activated carbon particles may be employed, it is preferred that the amount of said −325 mesh particles be about 28% by weight of the activated carbon particles and that 72% by weight of the activated carbon particles be the −200 to +325 mesh particles. Also, it is preferred that the amount of activated carbon particles comprise about 81% by weight of the essentially homogeneous mixture and the binder powder comprise about 19% by weight of said mixture.

The thermoplastic binder can be composed of nearly any thermoplastic material including, for example, polyolefins such as polyethylene, polypropylene, polybutene-1 and poly-4-methyl-pentene-1; polyvinyls such as polyvinyl chloride, polyvinyl fluoride and polyvinylidene chloride; polyvinyl esters such as polyvinyl acetate, polyvinyl propionate and polyvinyl pyrrolidone; polyvinyl ethers; polyvinyl sulfates; polyvinyl phosphates; polyvinyl amines; polyoxidiazoles; polytriazols; polycarbodiimides; copolymers and block interpolymers such as ethylene-vinyl acetate copolymers; polysulfones; polycarbonates; polyethers such as polyethylene oxide, polymethylene oxide and polypropylene oxide; polyarylene oxides; polyesters, including polyarylates such as polyethylene terphthalate, nylons polyimides and variation on these and other polymers having substituted groups such as hydroxyl, halogen, lower alkyl groups, lower alkoxy groups, monocyclic aryl groups and the like, and other thermoplastic meltable solid materials. Preferred are polyethylene, poly(ethylene vinyl acetate) and nylons. Especially preferred as a binder is polyethylene, particularly grade SN 510 polyethylene from the USI Division of Quantum Chemical Corporation.

If desired, a small amount of the about 75% to about 85% by weight activated carbon particles in the essentially homogeneous mixture can be replaced with additional particulate or powdered additive materials to enhance the performance of the filter. For example, from about 6% to 20% by weight of zeolite can be added to increase adsorption of heavy metals, such as lead, from the water or other liquid to be filtered. An especially preferred zeolite that can be employed as such an additive is ATS titanium silicate zeolite with high specificity for adsorbing lead, which zèolite is available from Engelhard Corporation. As examples of other additives which may be employed in small amounts, generally in amounts of less than about 10% by weight, there may be mentioned diatomaceous earth, ceramics, ion exchange resins and the like.

The components of the extrudable composition are to be mixed to an essentially homogeneous mixture before extrusion of the mixture into the desired thin-walled carbon tubes. After the components have been mixed to an essentially homogeneous mixture, the mixture can be extruded into the desired thin-walled carbon tubes by extrusion according to the process and with the apparatus described in my U.S. Pat. No. 5,189,092.

The extruded, thin-walled carbon tubes of this invention will generally have a density of from about 0.65 to about 0.75 g/cm$^3$. For example, according to this invention it is possible to produce an activated carbon filter tube of an average density of 0.72 g/cm$^3$ having a 2.0 inch (50.8 mm) O.D. and a 1.4 inch (35.56 mm) I.D., i.e. a wall thickness of 0.3 inch (7.62 mm). The tube can be continuously extruded and cut to any desired length, such as for example, 10 inches long (254 mm).

In accordance with this invention such an extruded thin-walled activated carbon tube is produced according to U.S. Pat. No. 5,189,092, cut to the desired length and then the tube is mounted or bonded to two suitable end caps or to one end cap and mounted in a suitable cartridge housing or some similar suitable configuration for filters.

Illustrated in the FIGURE is a typical thin-walled filter tube element of this invention mounted in a cartridge and suitable for use as a unit in purifying water to sub-micron particle size levels. It is to be recognized that the thin-walled filter tubes of this invention can be used in any suitable environment and that its description of being housed in the cartridge of the FIGURE is merely an exemplary and non-limiting embodiment.

The filtration unit 10 of the FIGURE comprises a cartridge 12 housing a thin-walled, extruded filter tube 14 of this invention. The cartridge 12 can be made of any suitable material, such as for example, metal or plastic, such as polypropylene or the like. The cartridge 12 comprises a substantially cylindrical hollow housing having sidewall 16, which at a first end 18, such as a lower end, can be slightly flared to fit into a suitable base for mounting the filter unit 10 to a source of water or liquid to be purified. The lower end 18 is closed by a base wall 20. The base 20 includes an axial passageway 22 to the interior of the hollow cartridge 12. A conduit or pipe 24 is mounted in said axial passageway 22 for permitting filtered, purified water or other liquid to exit from the interior of the hollow cartridge 12. If desired or necessary, the sidewall 16 can be provided with an exterior groove 26 with an O-ring 28 mounted therein for sealingly sealing the filtration unit 10 in a water or liquid supply source (not shown). A radial passageway 30 is provided in the sidewall for permitting water or other liquid to be filtered to enter into the interior of the hollow cartridge. A thin-walled, extruded, porous activated carbon filter tube 14 of this invention is provided with a capping disk 32 at one end to close said end of the filter tube. The disk 32 has a central protrusion 34 which extends into the hollow tubular passageway 36 of the filter tube 14 for purposes of alignment. The disk 32 is also provided with a peripheral rim 38 for aligning the filter tube 14 and closing off the end of said filter tube. The function of disk 32 is to prevent water or other liquid from passing axially into the hollow tubular axial passageway 36 of the filter tube 14.

At the second or upper end of the sidewall 16 the cartridge 12 is closed with an end cap 40 provided with a central recess 42 for receiving, holding and aligning capping disk 32 by engaging a raised central hub 44 on the disk. The disk 32 may be provided with a plurality of radial ribs 46 which can also assist in the alignment process.

The thin-walled filter tube 14, provided with capping disk 32 at one end and the filter tube, is inserted into cartridge 12 with the open end of the filter tube surrounding axially passageway 22 and exit conduit 24. Subsequently, the cartridge is closed by end cap 40 by inserting raised hub 44 on disk 32 into the central recess 42 of the end cap. The assembled filtration unit 10 can now be employed by installation into a system whereby water or other liquid to be purified enters cartridge 12 through radial passageway 30 and flows into the interior space 48 between the cartridge sidewall 16 and the thin-walled filter unit 14. Because the upper end of the tubular axial passageway 36 is blocked by capping disk 32, the water or liquid is forced to flow radially through the porous thin-walled filter tube and down the tubular axial passageway where it enters the conduit 24 at the bottom of the cartridge 12, flowing therethrough as water or other liquid purified to a sub-micron level.

The invention is further illustrated by the following example of the preparation and testing of a thin-walled activated carbon filter tube of this invention.

EXAMPLE

A substantially homogeneous mixture is prepared by mixing about 81% by weight of type TOG-NDS acid washed, bituminous coal-based activated carbon particles with about 19% by weight type SN 510 polyethylene powder having a particle size within the range of from 5 $\mu$m to 25 $\mu$m. The 81% by weight activated carbon comprised about 28% by weight of −325 mesh activated carbon particles and about 72% by weight of −200 to +325 mesh activated carbon particles. The substantially homogeneous mixture was then extruded into a thin-walled hollow tube of 2″ O.D. (50.8 mm)×1.4″ I.D. (35.56) and having an average dry density of about 0.72 g/cm$^3$ by the extrusion process and apparatus disclosed in the aforementioned U.S. Pat. No. 5,189,092. The substantially homogeneous mixture was heated for about 5 minutes in the extruder heating zone maintained at a temperature of about 375° F. (190° C.), and cooled for about 3 minutes in the extruder cooling zone maintained at a temperature of about 95° F. (35° C.) before being extruded as a thin-walled hollow tube. The thin-walled hollow tube was then cut into suitable lengths of about 10 inches (254 mm) for use in testing as a filter for removing sub-micron sized particles.

Using water contaminated with PTI fine test dust powder, the filter tubes of this invention were tested for sub-micron sized particulate removal. Flowing such contaminated water at 0.5 gal/min. through the above produced thin-walled filter tubes mounted in an appropriate cartridge and having a pressure drop across the filter of about 14 $psi_d$ resulted in the exiting purified water having a 99.9% reduction of contaminating dust particles of a size of from 0.5 μm to 0.8 μm as measured using a laser in-line particle counting technique.

When a similar type thin-walled filter tube is produced having an average dry density of 0.67 g/cm$^3$ and tested with said dust contaminated water flowing at 0.5 gal/min. with a pressure drop across the filter of 7.5 $psi_d$, 99.8% of particles in the size range of from 0.8 μm to 1 μm were removed as measured by the laser in-line particle counting technique.

The extruded thin-walled activated carbon filter tubes of this invention are characterized by the fact that the surface of the extruded tubes are extremely hard and smooth and as a result particulates filtered out on the outer surface of the extruded tubes are readily removed which permit repeated re-use of the filter tubes after cleaning. Additionally, the hard/smooth surface of the extruded thin-walled activated carbon filter tubes of this invention prevents release of carbon particles from the interior surface of the tubular filters and into the purified water or other liquid.

With the foregoing description of the invention, those skilled in the art will appreciate that modifications may be made to the invention without departing from the spirit thereof. Therefore, it is not intended that the scope of the invention be limited to the specific embodiments illustrated and described.

What is claimed is:

1. A process for purifying water or other filterable liquid to remove at least 99.5% of sub-micron particles from said water or other filterable liquid comprising filtering the water or other filterable liquid through the wall of an extruded, thin-walled activated carbon filter tube which has been extruded from a composition comprising an essentially homogeneous admixture of;
    (a) from about 75% to about 85% by weight activated carbon particles, and
    (b) from about 15% to about 25% by weight of a thermoplastic binder powder having an average particle size of from about 5 μm to about 25 μm;
wherein the activated carbon particles comprise;
    (a) from about 18% to about 50% by weight of activated carbon particles passing through a 325 mesh screen, and
    (b) from about 50% to about 82% by weight of activated carbon particles passing through a 200 mesh screen and retained on a 325 mesh screen.

2. The process of claim 1 comprising the purifying of water.

3. A process for purifying water or other filterable liquid to remove at least 99.5% of sub-micron particles from said water or other filterable liquid comprising filtering the water or other filterable liquid through the wall of an extruded, thin-walled activated carbon filter tube which has been extruded from a composition comprising an essentially homogeneous admixture of:
    (a) about 81% by weight activated carbon particles, and
    (b) about 19% by weight of a thermoplastic binder powder having an average particle size of from about 5 μm to about 25 μm; and
wherein the activated carbon particles comprise about 28% by weight of activated carbon particles passing through a 325 mesh screen and about 72% by weight of activated carbon particles that pass through a 200 mesh screen but are retained on a 325 mesh screen.

4. The process of claim 3 comprising the purifying of water.

5. A process for purifying water or other filterable liquid to remove at least 99.5% of sub-micron particles from said water or other filterable liquid comprising filtering the water or other filterable liquid through the wall of a thin-walled activated carbon filter tube having a wall thickness of about 0.5 inch (12.7 mm) or less and an average dry density from about 0.65 to about 0.75 g/cm$^3$ wherein the tube has been extruded from a composition comprising an essentially homogeneous admixture of:
    (a) about 81% by weight acid-washed, bituminous coal-based activated carbon particles, and
    (b) about 19% by weight of a thermoplastic binder powder having an average particle size of from about 5 μm to about 25 μm;
wherein the activated carbon particles comprise:
    (a) about 28% by weight of activated carbon particles passing through a 325 mesh screen, and
    (b) about 72% by weight of activated carbon particles that pass through a 200 mesh screen but are retained on a 325 mesh screen.

6. The process of claim 5 comprising the purifying of water.

* * * * *